United States Patent [19]
Kaiser

[11] Patent Number: 5,593,536
[45] Date of Patent: Jan. 14, 1997

[54] APPARATUS FOR FORMING REINFORCING STRUCTURAL REBAR

[75] Inventor: Mark A. Kaiser, Elida, Ohio

[73] Assignee: Marshall Industries Composites, Lima, Ohio

[21] Appl. No.: 467,157

[22] Filed: Jun. 6, 1995

Related U.S. Application Data

[63] Continuation of Ser. No. 267,565, Jun. 28, 1994, abandoned.

[51] Int. Cl.⁶ ............................ B65H 81/00; B65H 81/06; B32B 31/00
[52] U.S. Cl. ............................ 156/433; 156/441; 156/500; 156/580; 156/581; 156/583.1; 156/180; 264/136; 264/137
[58] Field of Search ................... 156/180, 433, 156/441, 500, 245, 580, 581, 583.1; 264/136, 137; 428/377; 425/112

[56] References Cited

U.S. PATENT DOCUMENTS

| | | | |
|---|---|---|---|
| T101,401 | 1/1982 | Zion | 156/433 X |
| 3,793,108 | 2/1974 | Goldworthy . | |
| 4,276,337 | 6/1981 | Coonrod . | |
| 4,440,593 | 4/1984 | Goldworthy . | |
| 4,445,957 | 5/1984 | Harvey . | |
| 4,462,945 | 7/1984 | Goldsworthy . | |
| 4,620,401 | 11/1986 | L'Esperance et al. | 428/377 X |
| 4,681,722 | 7/1987 | Carter et al. . | |
| 4,752,513 | 6/1988 | Rau et al. . | |
| 4,804,427 | 2/1989 | Paul et al. . | |
| 4,883,552 | 11/1989 | O'Connor et al. | 156/441 X |
| 4,892,600 | 1/1990 | Beever . | |
| 5,047,104 | 9/1991 | Preis et al. | 156/161 X |
| 5,077,113 | 12/1991 | Kakihara et al. | 428/377 X |
| 5,084,221 | 1/1992 | Matsuno et al. . | |
| 5,098,496 | 3/1992 | Breitigam et al. . | |
| 5,114,633 | 5/1992 | Stewart . | |
| 5,156,787 | 10/1992 | Booher . | |
| 5,182,064 | 1/1993 | Ishizuka et al. | 264/137 |

FOREIGN PATENT DOCUMENTS 61-235115  10/1986  Japan .................................. 264/136

OTHER PUBLICATIONS

"C-Bar Composite Rebar Offered To Solve Corrosion Problems Fiber Reinforced Plastic (FRP) Rebar For Concrete Also Uses Green Materials", *Composite News: Infrastructure*, (14 Feb. 1995).

Modern Plastics Encyclopedia 1983-1984, Oct. 1983, vol. 60, No. 10A, pp. 200, 202, 204, 205.

*Primary Examiner*—Jeff H. Aftergut
*Attorney, Agent, or Firm*—Bell, Seltzer, Park & Gibson, P.A.

[57] ABSTRACT

An apparatus for forming reinforcing structural rebar comprising a core of a thermosetting resin containing reinforcing material and an outer of sheet molding compound is provided. The apparatus comprises layer reinforcing material supply, a thermosetting resin supply means, a shaping die, means for impregnating the reinforcing material the reinforcing material with resin, means for pulling the reinforcing material through the shaping die to form the core of the thermosetting resin containing reinforcing material, sheet molding compound supply, guide means for guiding the sheet molding compound onto the core, and mold means for molding the outer layer of sheet molding compound onto the core.

12 Claims, 2 Drawing Sheets

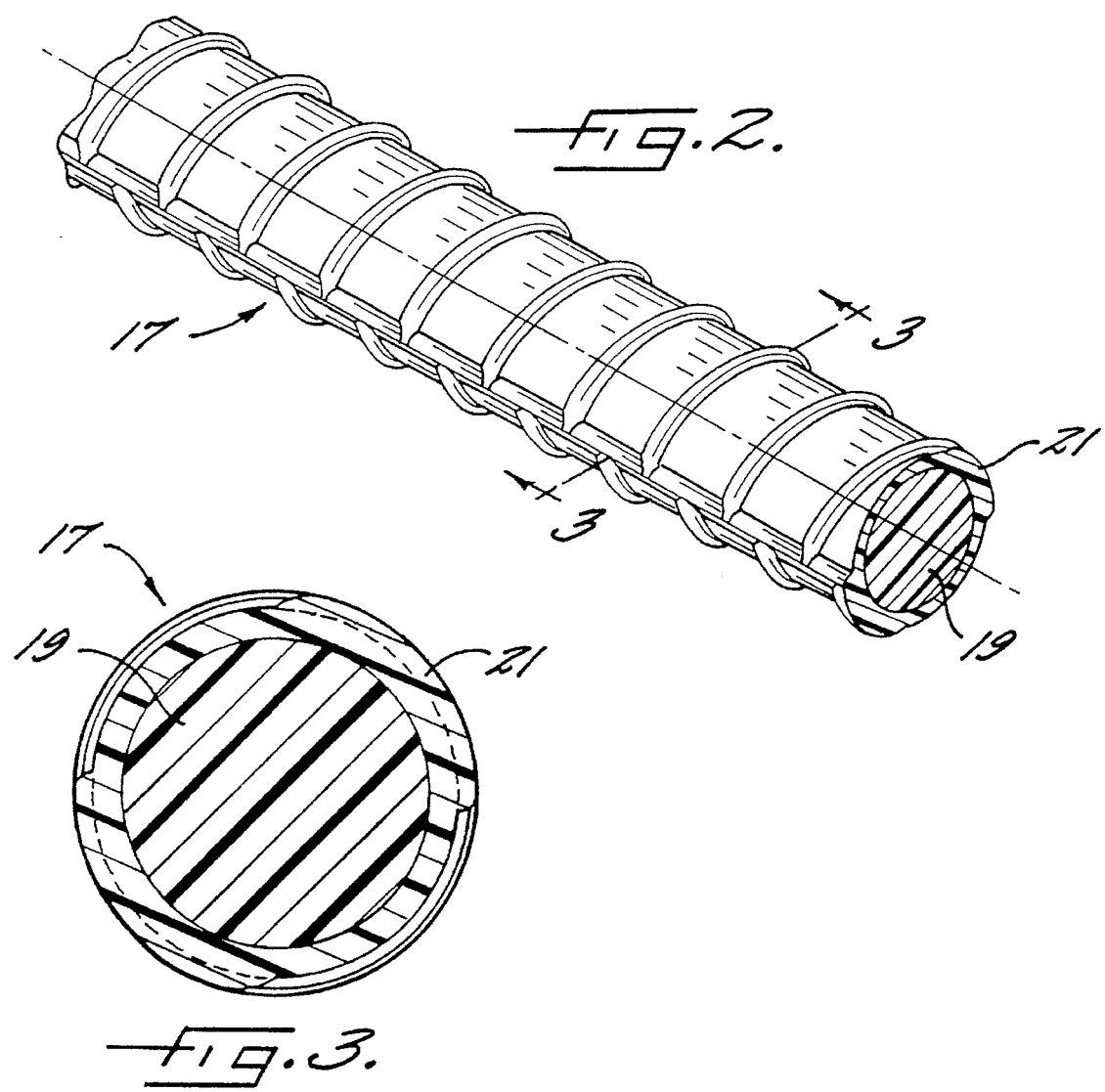

APPARATUS FOR FORMING REINFORCING STRUCTURAL REBAR

This application is a continuation of application Ser. No. 08/267,565, filed 28 Jun. 1994, now abandoned.

FIELD OF THE INVENTION

The present invention relates to an apparatus for making reinforcing structural rebar. More particularly, the present invention relates to an apparatus for making reinforcing structural rebar comprising a pultruded core of a thermosetting resin and an outer layer of sheet molding compound (SMC).

BACKGROUND OF THE INVENTION

It is well known that pultrusion processes are effective continuous processes for producing constant cross-sectional profiles. Conventional pultrusion processes involve drawing a bundle of reinforcing material (e.g., glass filaments or fibers) from a source thereof, wetting the fibers and impregnating them with a preferably thermosettable polymer resin by passing the reinforcing material through a resin bath in an open tank, pulling the resin-wetted and impregnated bundle through a shaping die to align the fiber bundle and to manipulate it to the proper cross-sectional configuration, and curing the resin in a mold while maintaining tension on the filaments. Because the fibers progress completely through the pultrusion process without being cut or chopped, the resulting products have exceptionally high longitudinal strength. Exemplary pultrusion techniques are described in U.S. Pat. Nos. 3,793,108 to Goldsworthy; 4,394,338 to Fuway; 4,445,957 to Harvey; and 5,174,844 to Tong.

Exemplary pultruded articles include tool handles, mine shaft bolts, pipes, tubing, channel, beams, fishing rods and the like. Of particular interest is the manufacture of fiber reinforced rods or bars ("rebar").

Sheet molding compound ("SMC") is a composite comprising fibers, a thermosetting resin (e.g., unsaturated polyester resin), and pigments, fillers, and the like. These components are compounded and processed in sheet form to facilitate subsequent molding of the SMC. SMC is typically compression molded by placing a charge in a matched metal mold and applying pressure and heat with a hydraulic press, which causes the SMC to flow to all areas of the mold. See, *Composites*, "Sheet Molding Compounds" Engineered Materials Handbook™, vol. 1, pp. 157–160 (1987).

Although pultrusion apparatus and apparatus for molding SMC are separately known, it would be desirable to provide an apparatus that effectively combines the pultrusion apparatus and an apparatus for molding SMC. It would be particularly desirable for such apparatus to enable the continuous manufacture of such rebar.

It is, therefore, an object of the invention to provide an apparatus combining a pultrusion apparatus and an apparatus for molding SMC. It is another object of the invention to provide an apparatus for making reinforcing structural rebar comprising a pultruded core of a thermosetting resin and an outer layer of SMC. Other objects, features, and advantages of the invention will be particularly identified below.

SUMMARY OF THE INVENTION

The present invention provides an apparatus particularly adapted for forming reinforcing structural rebar comprising a core of a thermosetting resin having reinforcing material and an outer cladding of sheet molding compound. The apparatus comprises a thermosetting resin supply means, a shaping die, means for impregnating the reinforcing material with resin, means for pulling the reinforcing material through the shaping die to form the core of the thermosetting resin having reinforcing material, means for guiding the sheet molding compound onto the core, and mold means for molding the outer cladding of sheet molding compound on the core.

BRIEF DESCRIPTION OF THE DRAWINGS

FIG. 2 is a perspective view of the reinforcing structural rebar made using the apparatus of the present invention.

FIG. 3 is a cross-sectional view taken substantially along line 3—3 of FIG. 2 and showing the reinforcing structural rebar.

DETAILED DESCRIPTION OF THE INVENTION

Figure 1:
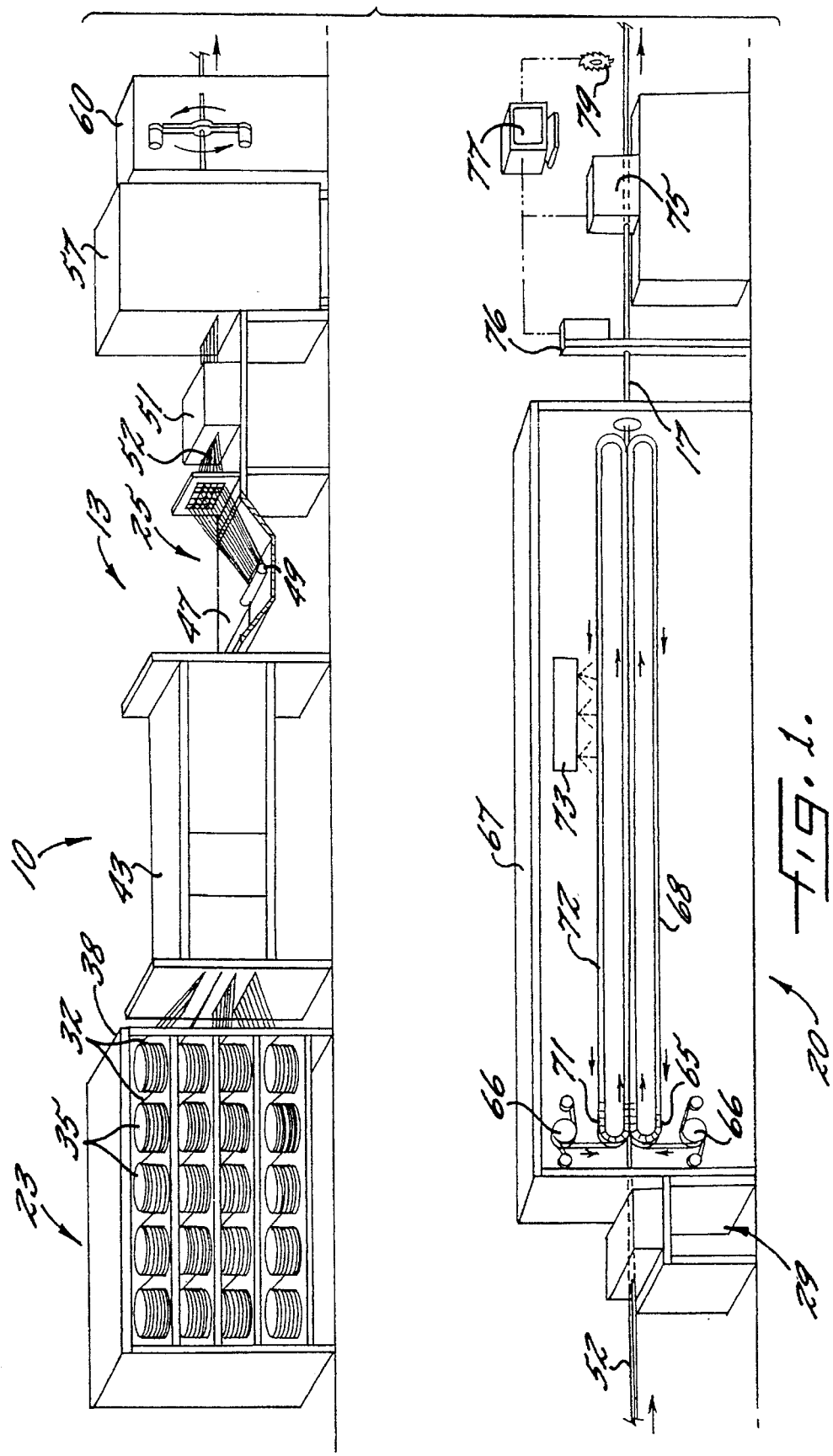
FIG. 1 is a diagrammatic and schematic illustration of the apparatus of the present invention.

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As shown in FIG. 1, the apparatus 10 of the present invention includes a pultrusion station 13 and a sheet molding compound station 20. The apparatus 10 is used to make a reinforcing structural rebar 17 (FIGS. 2 and 3) comprising an inner core 19 of thermosetting resin and an outer layer or cladding 21 of sheet molding compound. A specific reinforcing structural rebar construction is described in commonly assigned copending U.S. Ser. No. 08/267,772 filed Jun. 28, 1994, having Attorney Docket No. 5458-36, the disclosure of which is incorporated by reference in its entirety.

Pultrusion Station

The pultrusion station 13 generally includes a reinforcing material supply 23, a bath 25 of a thermosetting resin or other thermosetting resin supply means and a shaping die 29 (FIG. 1). The reinforcing material supply 23 comprises a plurality of reinforcing material 32 on a plurality of spools 35 mounted on a storage rack, such as the bookshelf style creel 38 shown in FIG. 1. The reinforcing material 32 comprises fibers selected from the group consisting of fibers of glass, carbon, metal, aromatic polyamides, polybenzimidazoles, aromatic polyimides, polyethylene, nylon, and blends and hybrids thereof. These fibers are supplied in the form of a roving, mat, veil, fabric or the like. Typically, the reinforcing material is E-glass fibers in the form of roving. The creels 38 can include virtually any number of spools 35; creels including 100 or more spools are common. Preferably, the reinforcing material 32 is drawn from the spools 35 through a series of ceramic bushings (not shown) positioned at the front of the creel 38 to maintain alignment and reduce breakage of the reinforcing material 32.

From the creel 38, the reinforcing material 32 is guided via a creel guide or card 43 to the bath 25 (shown in sectional view in FIG. 1) of an unsaturated polyester resin or other thermosetting resin 47 such as vinyl ester resins, polyurethanes, epoxies, and phenolics. The creel guide 43 controls alignment to prevent twisting, knotting or any other damage to the reinforcing materials. The reinforcing material 32 is directed under an impregnating roll(s) or bar(s) 49 (i.e., a so-called "wet-out bar"), which submerges the reinforcing material in the bath 25 and impregnates it. This type of bath is sometimes referred to as a "dip bath."

Alternatively, the reinforcing material 32 can be impregnated with themosetting resin 47 via an apparatus that injects the thermosetting resin 47 onto the reinforcing material 32. Such injection apparatus are known to those skilled in this art, as are other means for impregnating the reinforcing material.

After impregnation, the impregnated reinforcing material (designated 52 in FIG. 1) is formed into the core 19. A forming station 51 prior to the shaping die 29 is preferably included to ensure positive alignment of the impregnated reinforcing material 32 relative to the die 29. If the core 19 is to be tubular, a mandrel and mandrel support extending the mandrel (not shown) are employed to extend the mandrel in a cantilevered fashion through the pultrusion die while resisting forward drag on the mandrel. Various guide slots, holes, and clearances of the forming station 51 must be sized to prevent excess tension on the relatively weak and wet material 52, but must also permit sufficient resin removal to prevent viscous drag on the material at the entrance of the shaping die 29 from being too high.

After the forming station 51, the impregnated resin material 52 is preferably preheated prior to the shaping die 29 in a radio frequency oven or other suitable heating unit 57 known to those skilled in the art. Preferably, the impregnated resin material 52 is uniformly heated throughout its cross-section to reduce the duration that the material must stay in the shaping die 29. Preheating can also enable thick sections of impregnated material 52 to be manufactured without large thermal stresses being created therein due to uneven heat distribution in the material 52. Such thermal stresses can result in microcracking and reduced chemical resistance of the SMC. The shaping die is also preferably heated such as described in *Composites, Engineered Materials Handbook*™, Vol. 1, pp. 534–535 (1989).

Optionally, the impregnated material 52 can then travel through a circumferential winder 60 positioned prior to the shaping die 29. The circumferential winder 60 wraps one or more fiberglass layers around the core 19. The fiberglass layers are typically dry. The fibers of the fiberglass layers are typically oriented in a direction other than in the axial direction of the core 19. Preferably, two fiberglass layers are added: one that is placed on the core so that its fibers are oriented at approximately a 45 degree angle to the core fibers, and another that is placed on the core so that its fibers are oriented to be perpendicular to the first wrap and approximately 45 degrees relative to the core fibers. The wrap angles can be controlled by the number of rotational fiber packages added and the speed of the wind and line-speed. The fiberglass layers can add strength to the core, particularly in nonaxial directions. In addition, because the fiberglass layers are added to the core as a fibrous surface, the fibers contained therein remain on the surface of the core 19 as it travels through the shaping die 29. The fibers on the inner surface of the layer become imbedded in the core during shaping, while the fibers on the outer surface of the core do not. These outer fibers thus provide a substrate to which the SMC cladding layer 21 can mechanically bond.

The impregnated material 52 then proceeds to the shaping die 29 to be formed into the core 19. As it travels through the die 29, the material 52 takes a cross-sectional shape corresponding to the die profile. Illustratively and preferably, the die profile and the resulting core cross-section are circular (FIG. 3). Also, as the material 52 proceeds through the die 29, the thermosetting resin 47 reacts under the heat and pressure generated by the die, and partially cures.

A number of different methods can be used to position and anchor the shaping die 29 and to apply the heat necessary to initiate the thermosetting reaction of the resin 47. The use of a stationary die frame with a yoke arrangement that allows the die to be fastened to the frame is the simplest arrangement. In all die-holding designs, the drag force that develops as material is pulled though the die must be transferred to the frame without causing die movement or frame deflection. With a yoke arrangement, heating jackets that employ hot oil or electrical resistance strip heaters are positioned around the die at desired locations. Thermocouples are also placed in the die to control the level of heat applied. Multiple individually-controlled zones can be configured in this manner. This approach is well suited to single-cavity set-ups but becomes more complex when the number of dies used simultaneously increases, as each die requires its own heat source and thermocouple feedback device. Standard heating jackets and heating plates designed to accommodate multiple dies can be used to help alleviate this limitation.

Another popular die station configuration uses heated platens that have fixed zones of heating control with thermocouple feedback from within the platen. The advantage of this method is that all dies can be heated uniformly with reduced-temperature cycling, because changes in temperature are detected early at the source of heat rather than at the load. In the same respect, however, a temperature offset will be common between the platen set point and the actual die temperature. With knowledge of the differential, an appropriate set point can be established. The advantage of quick set-up and replacement of dies stemming from the use of heated platens can lead to increased productivity through reduced down-time, particularly when means to separate the platens automatically are included.

A source of cooling water or air should be included in the front of the die at start-up and during temporary shutdown periods to prevent premature gelation of the resin at the tapered or radiused die entrance. This can be accomplished by using either a jacket or a self-contained zone within the heating platen. Alternatively, the first section of the die can be unheated, and cooling can be accomplished through convection.

A particularly important pultrusion process control parameter is the die heating profile because it determines the rate of the thermosetting reaction, the position of the reaction within the die, and the magnitude of the peak exotherm. Improperly cured materials will exhibit poor physical and mechanical properties, yet may appear identical to adequately cured products. Excess heat input may result in products with thermal cracks or crazes, which destroy the electrical, corrosion resistance, and mechanical properties of the composite. Heat-sinking zones at the end of the die or auxiliary cooling may be necessary to remove heat prior to the exit of the product from the die.

Sheet Molding Compound Station

After exiting the shaping die 29, the core 19 then enters the sheet molding compound station 20, wherein sheet molding compound 21 is clad around the core 19. Preferably, the core 19 is partially thickened or partially polymerized (i.e., "B-staged") prior to contacting with the SMC. The SMC forming the cladding layer 21 comprises an unsaturated polyester resin or other thermosetting resin such as vinyl ester resins, polyurethanes, epoxies, and phenolics combined with fibers, fillers, pigments, and the like.

The SMC is introduced onto the core 19 with a guide 66 or other means for guiding SMC from a remote supply to the core 19. Typically, the SMC is provided as one or more strips formed into long rolls; the SMC roll generally will include a liner that separates the rolled layers that must be removed, preferably by a mechanical stripper, prior to the addition of the SMC to the core 19. The guide 66 presents one or more SMC strips to overlie opposite surfaces of the core 19; these strips are then molded to form the cladding layer 21.

The SMC station 20 includes a pair of endless series of mold halves 65, 71 mounted on chains 68, 72, respectively, which are positioned above and below the core 19. The mold halves 65, 71 are configured to mold SMC strips, thereby forming the cladding layer 21 surrounding the core 19. These molds are preferably male and female molds having a shear edge. During operation, the chains 68, 72 rotate in opposite rotational directions (i.e., the chain 68 rotates clockwise as seen in FIG. 1 and the chain 72 rotates counterclockwise). As these conveying units rotate, one of the mold halves 65 contacts and mates with one of the mold halves 71; in doing so, the halves enclose the core 19, upon which two SMC strips have been applied. The mating of the mold halves 65, 71 causes the cladding layer 21 to take the contoured shape of the mold. The mold halves 65, 71 remain in contact as they are conveyed by their respective chains 68, 72 along the length of the station 20. As the mold halves reach the forward end 61 of the station 20, they separate and are redirected to the rearward end of the station to repeat the process. The structural rebar exiting the SMC station 20 consists of the core 19 and an SMC cladding layer 21.

The mold halves 65 are attached to the chain 68 so that they are in adjacent abutting relationship as they are conveyed during molding. The mold halves 71 are similarly attached to the chain 72. As a result, the entirety of the cladding layer 21 is molded as it travels through the station 20 without gaps of unmolded SMC forming between abutting mold halves. In order to ensure that no SMC flashes between abutting mold halves, a continuous outer liner, such as a thin nylon film, can be inserted between the cavities of the mold halves 65, 71, and the SMC layers.

Operation and positioning of the mold halves is controlled by structural elements that are mounted either directly or indirectly to an overall station frame. Each of a pair of mold frames is mounted to the station frame via a pair of linear bearings located at either end of the molding frame; the linear bearings enable each chain frame to move vertically but constrain the chain frame from "racking" and thus ensure that the chain frames remain level. A rotating sprocket is mounted to each end of each molding frame and is operably coupled with a drive motor. Each cooperating pair of sprockets engages and drives one of the chains 68, 72, thereby causing each of the mold halves 65, 71 to travel in a flattened elliptical path. Pressure of a predetermined magnitude can applied to the mold halves 65, 71 through known pressurizing means; preferably, pressure is applied through one or more hydraulic pressure units mounted between the molding frames and the station frame. Preferably, the station frame 20 includes guiding means for controlling the pivotal movement of each mold half relative to its respective chain and to its mating mold half. The guiding means should be configured so that, as mating mold halves approach one another prior to mating contact, each has rotated to a position in which its mating edges are parallel with the mating edges of the other mating half. Guiding the mold halves into this orientation prevents the elongated strips of SMC from being pinched by the mold halves as they approach one another. The mold halves 65, 71 may also include registry means to ensure correct mating alignment between mating halves.

Preferably, each mold half 65, 71 includes a releasable cavity block or other pressure relief means that releases when the pressure within the mold half cavity exceeds a predetermined amount. The cavity block thus provides a fail-safe mechanism by which the mold halves can be protected in the event of undue pressure buildup due to improper registration of the mold halves, contamination in the SMC or core, or other malfunctions that unduly increase pressure within the mold cavity.

Heaters can be included in the SMC station 20 if the molding process so requires for curing of the core 19 or the cladding 21. Preferably, the heaters, which can be infrared cathode heaters or other heaters known to those skilled in this art, are positioned to heat the mold halves, and in particular the mold half cavities, as they return toward the rearward end of the station 20 after completing a molding cycle.

It is also preferred that the SMC station 20 include means for cleaning the mold halves 65, 71 during the operation. An exemplary cleaning means is a rotary brush system (not shown) mounted to the forward end of the station frame and operably coupled with and responsive to the movement of the chains 68, 72 that inserts a brush into the mold half cavities and between adjacent mold halves after the release of the molded rebar.

It is preferred that the tension applied to the core 19 that pulls the reinforcing material through the resin bath 25 and the shaping die 29 be provided by the drive motors that drive the chains 68, 72; however, the tension may be provided by a remote tensioning device. Further, the station may include an auxiliary pulling device that initiates pulling of the reinforcing material but is deactivated once the SMC molding process has reached a steady-state condition, thereby enabling the drive motor to provide the necessary tension for operation.

After molding, the rebar 17 can be printed using a recirculating ink jet printer 75. A programmable computer 77 and sensor 76 or other control means monitors the length of rebar 17 produced during the process. As a preprogrammed length is reached, a lot code identifying the lot by, for example, physical dimensions and manufacturing date and site, will be printed onto the rebar 17. Lot codes will typically vary depending upon the diameter and material used to process the rods.

As a final step, a flying cut-off saw 79 operably coupled with the computer 77 cuts the rebar 19 to a desired predetermined length. Preferably, the computer 77 is configured to sense and signal the saw 79 to cut the finished product to lengths as precise as the nearest thirty-second of an inch.

In the specification, there have been disclosed preferred embodiments of the invention. Although specific terms are employed, they are used in a generic and descriptive sense only and not for the purpose of limitation, the scope of the invention being defined by the following claims.

That which is claimed is:

1. An apparatus for forming reinforcing structural rebar comprising a core of a thermosetting resin containing reinforcing material and an outer layer of sheet molding compound, said apparatus comprising:

a thermosetting resin supply means;

a shaping die;

means for impregnating the reinforcing material with resin;

means for pulling the reinforcing material through the shaping die to form the core of the thermosetting resin containing reinforcing material;

first heating means associated with said shaping die configured to partially cure the core;

means for guiding a supply of sheet molding compound onto the core to provide an outer layer; and mold means for molding the outer cladding of sheet molding compound into a desired configuration on the core, said mold means including second heating means configured to cure the sheet molding compound and to complete the curing of the thermosetting resin of the core.

2. The apparatus defined in claim 1, further comprising sheet molding compound supply means operably coupled with said guide means.

3. The apparatus defined in claim 1, further comprising reinforcing material supply means operably coupled with said thermosetting resin supply means.

4. The apparatus defined in claim 1, wherein said reinforcing material supply means includes a plurality of spools.

5. The apparatus defined in claim 3, wherein said reinforcing material supply means further comprises means for aligning the reinforcing material prior to its being impregnated with the thermoset resin.

6. The apparatus defined in claim 1, wherein said mold means comprises at least one pair of mating mold halves configured to receive and form the sheet molding compound into the outer cladding layer.

7. The apparatus defined in claim 6, wherein said at least one pair of mating mold halves comprises a plurality of mating mold halves.

8. An apparatus for forming reinforcing structural rebar comprising a core of a thermosetting resin containing reinforcing material and an outer layer of sheet molding compound, said apparatus comprising:

reinforcing material supply means;

a thermosetting resin supply means;

a shaping die;

means for impregnating the reinforcing material with resin;

means for pulling the reinforcing material through the shaping die to form the core of the thermosetting resin containing reinforcing material;

first heating means associated with said shaping die configured to partially cure the core;

sheet molding compound supply means;

means for guiding the sheet molding compound onto the core to provide an outer layer thereon; and mold means for molding the outer cladding of sheet molding compound into a desired configuration on the core, said mold means including second heating means configured to cure the sheet molding compound and to complete the curing of the thermosetting resin of the core.

9. The apparatus defined in claim 8, wherein said reinforcing material supply means comprises a plurality of spools.

10. The apparatus defined in claim 9, wherein said reinforcing material supply means further comprises means for aligning the reinforcing material prior to its being impregnated with the thermoset resin.

11. The apparatus defined in claim 8, wherein said mold means comprises at least one pair of mating mold halves configured to receive and form the sheet molding compound into the outer cladding layer.

12. The apparatus defined in claim 8, wherein said at least one pair of mating mold halves comprises a plurality of mating mold halves.

* * * * *